United States Patent [19]
Nagano

[11] Patent Number: 5,298,999
[45] Date of Patent: Mar. 29, 1994

[54] JITTER DETECTION CIRCUIT

[75] Inventor: Yasuyuki Nagano, Osaka, Japan

[73] Assignee: SamSung Electronics Co., Ltd., Suwon, Rep. of Korea

[21] Appl. No.: 859,963

[22] Filed: Mar. 30, 1992

[30] Foreign Application Priority Data

Jul. 8, 1991 [JP] Japan .................. 3-167212

[51] Int. Cl.$^5$ .............................................. H04N 5/04
[52] U.S. Cl. ..................................... 348/497; 358/320; 360/36.1; 348/536
[58] Field of Search ............... 358/158, 149, 160, 166, 358/320-326; 360/36.1, 36.2; H04N 5/04

[56] References Cited

U.S. PATENT DOCUMENTS

| | | | |
|---|---|---|---|
| 4,317,220 | 2/1982 | Martin | 358/149 X |
| 4,438,456 | 3/1984 | Yoshinaka | 358/320 X |
| 4,504,799 | 3/1985 | Elmis et al. | 358/158 X |
| 4,555,734 | 11/1985 | Fukui | 358/320 X |
| 4,837,621 | 6/1989 | Yug | 358/149 X |
| 5,206,768 | 4/1993 | Fukada | 360/36.2 |

Primary Examiner—James J. Groody
Assistant Examiner—John W. Miller
Attorney, Agent, or Firm—Robert E. Bushnell

[57] ABSTRACT

A circuit for detecting a jitter of an image signal reproduced from a recording media comprises a variable oblique wave generating circuit for generating an oblique wave at timing according to the phase of the output pulse of a frequency dividing circuit wherein a tilt of the oblique wave is varied by an input control signal a sample-hold circuit for sampling and holding the tilt portion of the variable oblique wave in dependence upon reception of a horizontal synchronizing signal as a sample pulse.

20 Claims, 7 Drawing Sheets

JITTER DETECTION CIRCUIT

BACKGROUND OF THE INVENTION

This invention relates to a jitter detection circuit, and more particularly to a circuit for detecting a jitter of an image signal reproduced from a recording media.

When an image signal is reproduced from a recording media such as a magnetic tape, magnetic disc and optical disc, the reproduced signal includes a variation component of time base (jitter) due to a variation of transit speed of a recording media and other cause. Such a jitter deteriorates a reproduced picture quality. A reproduced image signal without the jitter can be generated by reading it after writing the reproduced image signal on a time base corrector (hereinafter called as 'TBC') utilizing a memory. In this case, it is necessary to apply a jitter detection signal to the TBC as a writing clock by detecting a jitter of the reproduced image signal.

Figure 9:
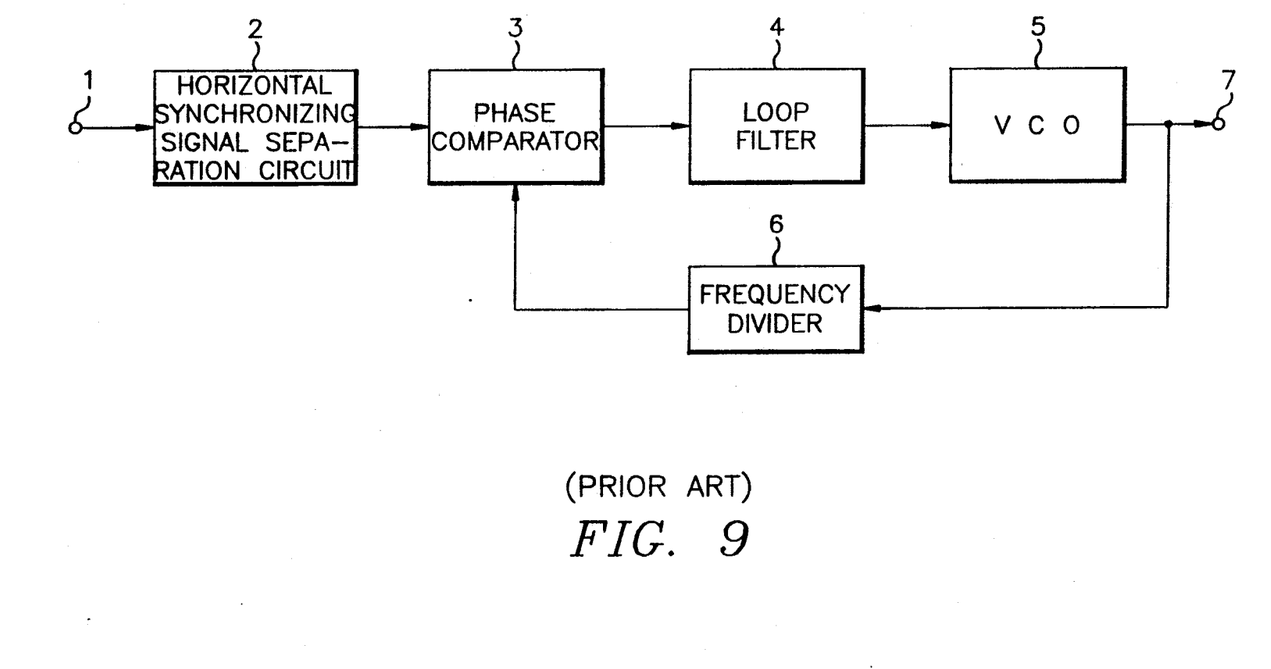
FIG. 9 is a block diagram of an example of the conventional circuit.

FIG. 9 shows a block diagram of an example of the conventional circuit for detecting a jitter. The conventional jitter detection circuit is used as an automatic frequency control (hereinafter called as AFC) circuit of a processing circuit for a reproduced carrier color chrominance signal in a home VTR using a helical scan method.

In helical a home VTR of helical scan method, there is widely used a VTR of low band conversion color recording and reproducing method, wherein a color image signal is separated into a luminance signal and a carrier chrominance signal, the luminance signal is converted as frequency-modulated luminance signal, the carrier chrominance signal is modulated in a band lower than that of the frequency-modulated luminance signal, and a signal formed by a frequency division multiplex of the two signals is recorded on a magnetic tape and reproduced by a rotating head.

Accordingly the VTR employing this method comprises a processing circuit of a reproduced carrier chrominance signal for converting a reproduced low band conversion carrier chrominance signal in an original frequency band, and an AFC circuit for generating a frequency conversion signal having a jitter as same as that of the reproduced low band conversion carrier chrominance signal in order to reduce a jitter included in a reproduced low band conversion carrier chrominance signal in converting the frequency of the reproduced low band conversion carrier chrominance signal.

With reference to FIG. 9, a reproduced luminance signal is fed to a horizontal synchronizing signal separation circuit 2 through an input terminal and a horizontal synchronizing signal separated by the separation circuit 2 is supplied to one input terminal of a phase comparator 3. The phase comparator 3 compares a phase of the reproduced horizontal synchronizing signal from the horizontal synchronizing signal separation circuit 2 with that of a horizontal scanning frequency signal from a frequency divider 6, with the result that the phase comparator 3 generates an error voltage corresponding to the phase difference therebetween.

A loop filter 4 integrates the error voltage and applies its result to a voltage control oscillator 5 (hereinafter called as 'VCO') as a control voltage.

The VCO 5, for example, has a self oscillating frequency of 320 $f_H$ ($f_H$ is a horizontal scanning frequency and 15.73426 KHz in a NTSC method). The frequency divider 6 divides an output oscillating frequency of the VCO 5 by 320 and transmits its result, a horizontal scanning frequency $f_H$, to other input terminal of the phase comparator 3.

Therefore the VCO 5 generates an output oscillating signal of 360 $f_H$ or close to 360 $f_H$ phase-synchronized with a reproduced luminance signal put into the input terminal 1. Because the reproduced luminance signal has the same jitter as the reproduced low band conversion carrier chrominance signal, the output oscillating signal comes from an output terminal 7 and becomes a frequency conversion signal for converting the frequency band of the reproduced low band conversion carrier chrominance signal into an original frequency band after being converted into a given frequency.

Considering a dubbing in a carrier chrominance signal recorder, the circuit as illustrated in FIG. 9 is installed for producing a carrier of a low band conversion chrominance signal phase-synchronized with a horizontal synchronizing signal extracted from an input image signal by the horizontal synchronizing signal separation circuit 2. In the circuit of FIG. 9, the low band conversion carrier chrominance signal is inserted at a given period (¼ in a NTSC and ⅛ in a PAL) within a horizontal scanning cycle.

In a VTR of low band conversion color recording and reproducing method, a low band conversion carrier chrominance signal is demodulated into an original frequency band by a reproduced carrier chrominance signal process circuit having a AFC circuit, and meanwhile a reproduced color image signal is generated by multiplexing a reproduced carrier chrominance signal having a reduced jitter and a reproduced luminance signal demodulated by a reproduced luminance signal process circuit.

The reproduced color image signal is transmitted to a color monitor, and is displayed as the reproduced color image signal which is practical and free of a jitter visually by utilizing a feature of a AFC and a APC (Automatic Phase Control) of the color monitor.

However a jitter of the reproduced luminance signal of the reproduced color image signal is not reduced at moreover not all and all jitter of the reproduced carrier chrominance signal is eliminated completely. So a TBC is used so as to completely eliminate jitter included in a reproduced color image signal in order to secure a picture image of high quality or a complete frequency interleaving between the reproduced luminance signal and the reproduced carrier chrominance signal.

But if an output oscillating signal of the VCO 5 which is a jitter detection signal detected by a conventional jitter detection circuit is used as a writing clock of the TBC, a the conventional jitter detection circuit is a sampling system of a horizontal scanning period and a feed back control circuit, and a visibility of the loop filter 4 requires a comparatively great value of 15 H (H is a horizontal scanning period). With the result that the follow-up of the jitter detection circuit is inferior.

In the conventional jitter detection circuit, a tape/head impact error jitter of high frequency occurred caused by a vibration of a magnetic tape just after contacting a rotating head or a skew occurred by an elasticity of a magnetic tape are not followed up sufficiently and a jitter detection signal can not be used as the writing clock.

SUMMARY OF THE INVENTION

The object of this invention is to provide a circuit for detecting a jitter having a good follow-up feature.

According to the present invention, a circuit for detecting a jitter comprises:

(a) a horizontal synchronizing signal separation circuit for separating a horizontal synchronizing signal from an image signal including a jitter;

(b) a voltage control oscillator for generating a frequency of "n" times the horizontal synchronizing signal, wherein the "n" is an integral number more than 4;

(c) a frequency dividing circuit for dividing the output frequency of the voltage control oscillator by the "n";

(d) a variable oblique wave generating circuit for generating an oblique wave by timing dependent upon a phase of an output pulse of the frequency dividing circuit, wherein a tilt of the oblique wave is varied by a control signal; and (e) a sample-hold circuit for sampling and holding the tilt portion of the variable oblique wave generating circuit as a sample pulse of about one horizontal scanning period, the sample pulse being produced by the horizontal synchronizing signal of the horizontal synchronizing signal separation circuit, and for supplying a sample hold voltage to the voltage control oscillator as a control voltage and to the variable oblique wave generating circuit as a control signal.

BRIEF DESCRIPTION OF THE DRAWINGS

These and other objects and many of the attendant advantages of this invention will be readily appreciated as the same becomes better understood by reference to the following detailed description when considered in connection with the accompanying drawings in which.

DETAILED DESCRIPTION OF THE PREFERRED EMBODIMENT

Figure 1:
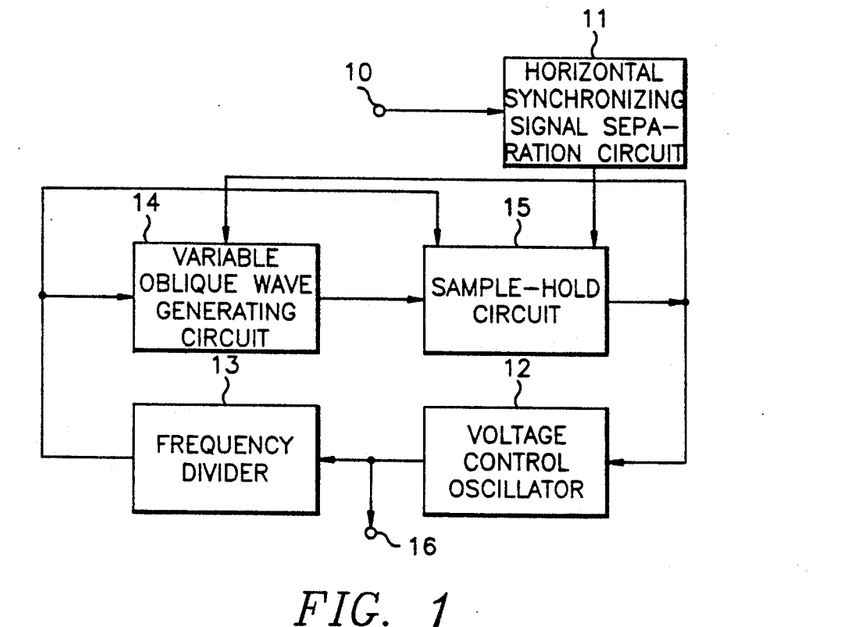
FIG. 1 is a block diagram of a principle of the present invention.

With reference to FIG. 1, a jitter detection circuit comprises a horizontal synchronizing signal separation circuit 11 for separating a horizontal synchronizing signal from an image signal including a jitter, a voltage control oscillator 12 for oscillating at a frequency of n times ('n' is an integer number larger than 4) the horizontal synchronizing signal, a frequency divider 13 for dividing an output oscillating frequency of the voltage control oscillator 12 by 'n', a variable oblique wave generating circuit 14 and a sample-hold circuit 15.

The variable oblique wave generating circuit 14 produces an oblique wave in timing according to a phase of an output pulse of the frequency divider 13 and a tilt of the oblique wave is varied by an input control signal.

The sample-hold circuit 15 samples and holds a tilt of an output oblique wave of the variable oblique wave generating circuit 14 as a sample pulse of an about one horizontal scanning period produced from an output horizontal synchronizing signal from the horizontal synchronizing signal separation circuit 11. The sample hold voltage of the sample-hold circuit 15 is supplied to the voltage control oscillator 12 as a control voltage and simultaneously to the variable oblique wave generating circuit 14 as the input control signal.

The frequency divider 13 comprises a first divider for dividing an output oscillation frequency of the voltage control oscillator 12 by 'k'('k' is an integer more than 2 and under the 'n') and a second divider having a number of m output terminals each for generating one pulse whenever it receives a number of m output pulses from the first divider. Output pulses from one end of the m output terminals and another output end are supplied to the variable oblique wave generating circuit 14 and the sample-hold circuit 15, respectively.

The variable oblique wave generating circuit 14 comprises a pulse generating circuit for producing a pulse having a given width less than one horizontal scanning period triggered before a point of sampling of the sample pulse by an output pulse from the frequency divider 13, and an integrating circuit for integrating an output pulse of the pulse generator during which an integration visibility is varied by the control signal.

The sample-hold circuit 15 comprises a delay circuit for generating the sample pulse according to an output horizontal synchronizing signal from the horizontal synchronizing signal separation circuit 11, a first sample-hold circuit for sampling and holding a tilt of the oblique wave by the sample pulse, and a second sample-hold circuit for producing a sample hold voltage after sampling and holding an output signal of the first sample-hold circuit in a timing of a horizontal blanking period of an image signal including a jitter by control of an output signal of the frequency divider 13.

An output oscillation frequency of the voltage control oscillator 12 is applied to the time base corrector for eliminating a jitter of an image signal as a writing clock.

The sample-hold circuit 15 samples and holds a tilt component of the oblique wave generated from variable oblique wave generating circuit 14 in dependence a sample pulse of one horizontal scanning period in order to provide a sample hold voltage. The sample-hold circuit 15 controls the output oscillator frequency by varying a timing of the variable oblique wave generator 14 and a tilt angle of the oblique wave. Accordingly a jitter before one horizontal scanning period is obtained from the sample-hold circuit 15.

Because 1/n divided pulses having a phase divided by m comes from a number of m output terminals of the second divider 22, a pulse having width essentially the same as the divided width of time interval between any horizontal synchronizing signal and a next horizontal synchronizing signal by m is always generated.

A timing according to a jitter before one horizontal scanning period is generated from the frequency divider 13, and an oblique wave having a tilt according to the jitter is produced from an integrating circuit.

A jitter detection voltage which is sampled at the first sample-hold circuit 25 is sampled again in the second sample-hold circuit 26. A variation of level at a sampling point of a jitter detection voltage is eliminated, and an output signal of first sample-hold circuit 25 is always sampled within a blanking period of an image signal including the jitter. Therefore, a point where the output sample hold voltage of the sample-hold circuit 15 varying according to the jitter is always within the blanking period.

Because an output oscillation frequency of the VCO 12 responding to a jitter before one horizontal scanning period is used as a writing clock of the time base corrector, an image signal including a jitter is written in the time base corrector by following up the jitter of high frequency.

Figure 2:
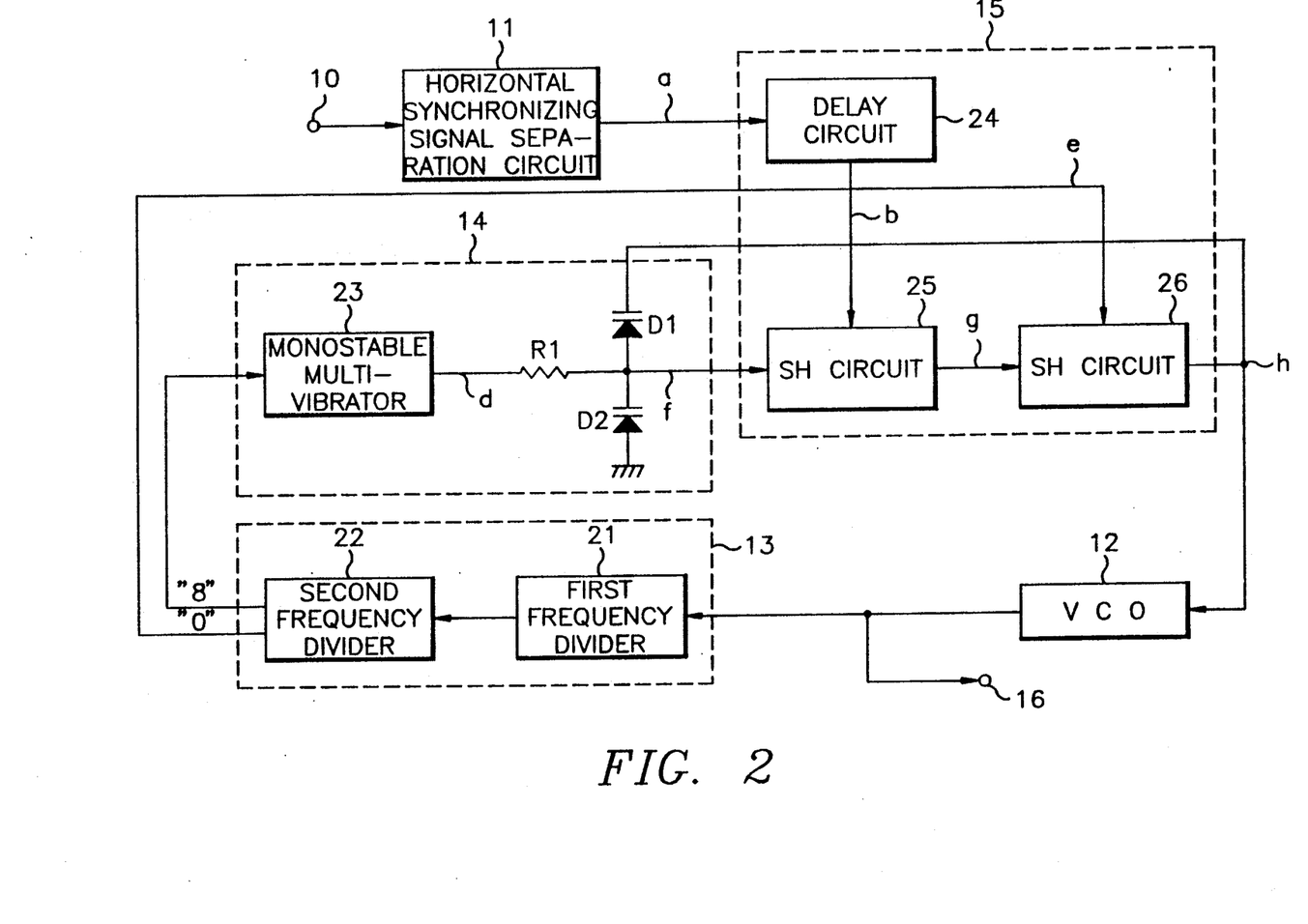
FIG. 2 is a circuit diagram of an exemplary embodiment of this invention.

With reference to FIG. 2, the voltage control oscillator 12 has a self oscillation frequency of 640 $f_H$, and an output oscillation frequency is controlled variably around 640 $f_H$. The frequency divider 13 comprises a first divider 21 and a second divider 22 connected serially with each other. The first divider 21 divides an output oscillation frequency of the VCO 12 by 64 (K=64). The second divider 22 divides a pulse of a repeated frequency 10 $f_H$ by 10 (m=10) and its result is a horizontal scanning frequency $f_H$.

Figure 3A:
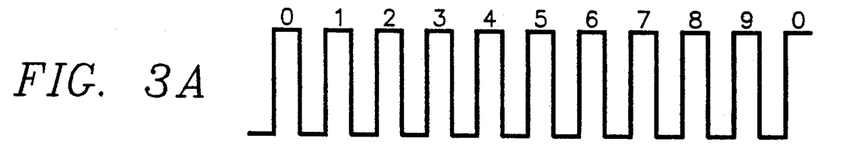
FIGS. 3A-3L are views of an input/output waveform of the Johnson counter comprising a frequency divider shown in FIG. 2.
Figure 3B:
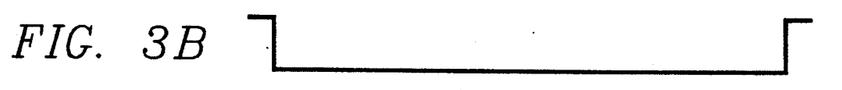

The second divider 22 comprises a Johnson counter consisting of a five steps shift register and a decoder, and the Johnson counter generates pulses as shown in FIG. 3B to 3L when receiving a pulse such as a pulse of FIG. 3A from the first divider 21. The Johnson counter generates an inverted pulse as shown in FIG. 3B through a first output terminal of its 11 output terminals, whenever it receives 10 input pulses as shown in FIG. 3A. And under the above condition, the Johnson counter generates pulses as shown in FIG. 3C to 3L, wherein each phase is divided by 10, through the other 10 output terminals.

Accordingly while a period of 10 cycles of an output pulse of the first divider 21 varies according to a jitter of each one horizontal scanning period 1H, the second divider 22 generates a pulse of which width is made by dividing the period of 10 cycles by 10, wherein the width varies according to a jitter.

Figure 3C:
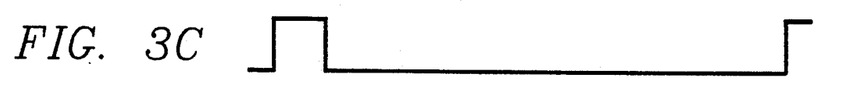
Figure 3D:
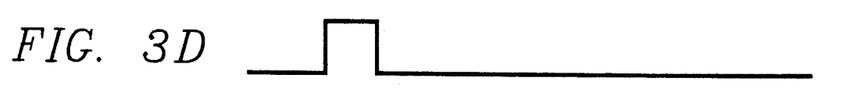
Figure 3E:
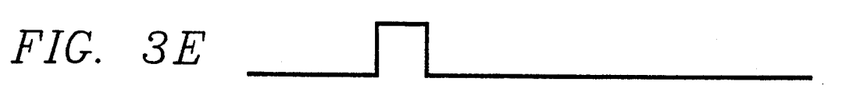
Figure 3F:
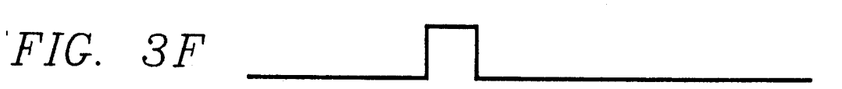
Figure 3G:
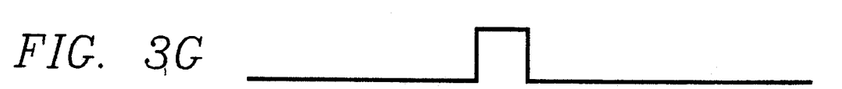
Figure 3H:
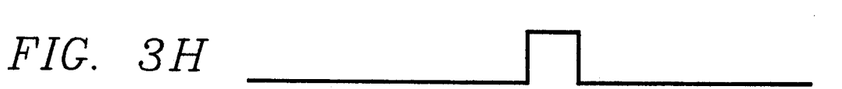
Figure 3I:
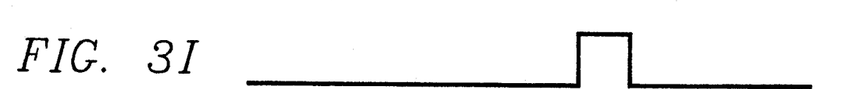
Figure 3J:
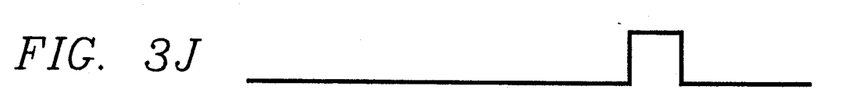
Figure 3K:
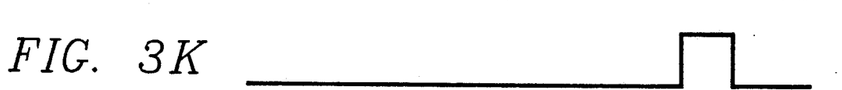
Figure 3L:
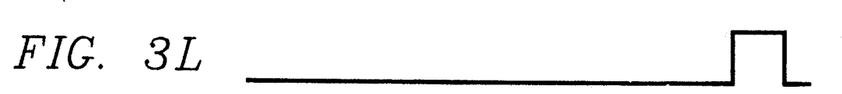

With reference to FIG. 3, a pulse generated when a Johnson counter value is of "0", as shown in FIG. 3C, is used as a sample pulse of a sample-hold circuit 26, and a pulse corresponding to a Johnson counter value of "8", as shown in FIG. 3K, is used as a trigger pulse of a monostable multivibrator 23.

With reference to FIG. 2, the variable oblique wave generator 14 comprises a monostable multivibrator 23, a resistor R1 having one end connected to the monostable multivibrator 23, a first variable capacitance diode D1 having an anode connected to the other end of the resistor R1, and a second variable capacitance diode D2 having a cathode is connected to the other end of the resistor R1 and on anode connected to a ground. The resistor R1 and the variable capacitance diodes D1, D2 constitute an integrating circuit for integrating an output pulse from the monostable multivibrator 23 and generating an oblique wave.

An integration visibility value of the integrating circuit is determined by a resistance of the resistor R1 and a capacitance of the variable capacitance diodes D1, D2. Particularly the capacitance of the variable capacitance diodes D1, D2 is varied with the sample hold voltage of the sample-hold circuit (hereinafter called as "SH") 26. Therefore, the integration visibility value and the tilt of the integration wave (Variable oblique wave) are varied with the sample hold voltage.

The sample-hold circuit 15 comprises a delay circuit 24 and a first and second SH circuits 25, 26. The delay circuit 24 delays a horizontal synchronizing signal separated from the horizontal synchronizing signal separation circuit 11 for a given time and generates a sample pulse of 1H frequency waveform-shaped. An embodiment of the configuration of the delay circuit 14 is illustrated in FIG. 4.

Figure 4:
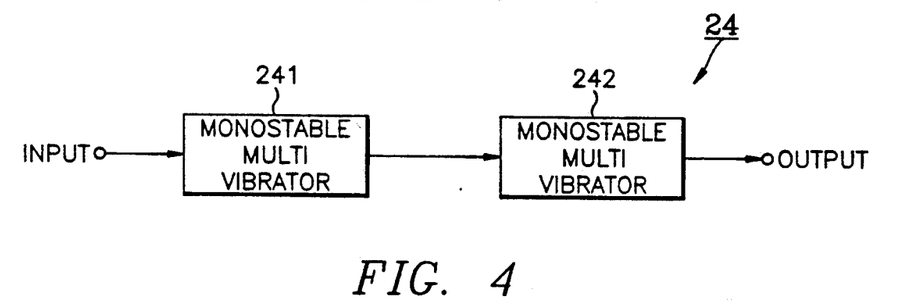
FIG. 4 is a block diagram of an exemplary configuration of a delay circuit shown in FIG. 2.

With reference to FIG. 4, the delay circuit 24 comprises a first monostable multivibrator 241 and a second monostable multivibrator 242 in a cascade connection. The first monostable multivibrator 241 delays an input horizontal synchronizing signal for a given time and the second monostable multivibrator 242 generates the sample pulse of a given width.

The first SH circuit 25 samples and holds an oblique wave out of a connection point of the anode of the variable capacitance diode D1 and the cathode of the variable capacitance diode D2 respectively in dependence upon an output sample pulse of the delay circuit 24. The second SH circuit 26 samples and holds an output sample hold voltage of the first SH circuit 25 an output independence upon sample pulse of the frequency divider 22.

The reason why the sample-hold circuit 15 comprises two SH circuits 25, 26 is that an output sample hold voltage may be overshooted at a sampling point and accordingly an output oscillation frequency is varied greatly. Moreover, a loop circuit including the VCO 12 is deviated from a synchronization if only one SH circuit 25 is installed. Therefore the other SH circuit 26 is required for sampling and holding a voltage in stable holding period of the output sample hold voltage of the SH circuit 25.

Figure 5:
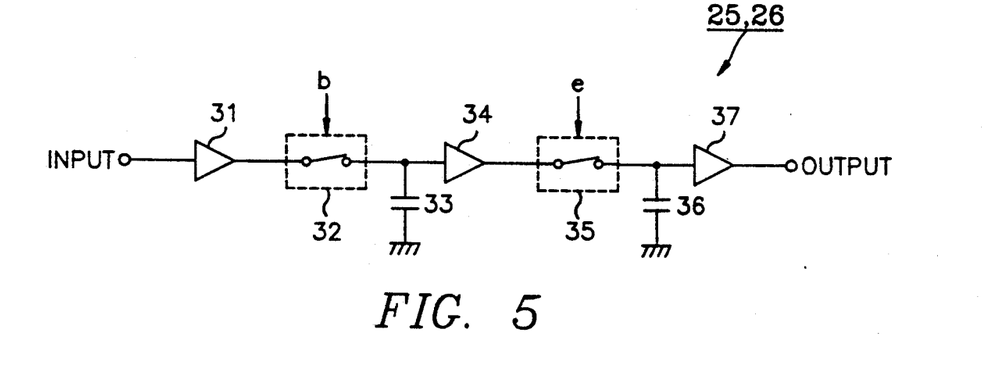
FIG. 5 is a view of a configuration of a sample-hold circuit shown in FIG. 2.

With reference to FIG. 5, the first SH circuit 25 comprises a first buffer amplifier 31, a first switch circuit 32, a first hold condenser 33 and a second buffer amplifier 34, and the second SH circuit 26 comprises the second buffer amplifier 34, a second switch circuit 35, a second hold condenser 36 and a third buffer amplifier 37. The second buffer amplifier 34 is used for the first and second SH circuits 25, 26 commonly. The buffer amplifiers 31, 34, 37 are designed to make a low output impedance from a high input impedance and to drive fully the first and second hold condensers 33, 36.

The first and second switch circuits 32, 35 each comprises a switching element such as a field effect transistor. The switch circuit 32 is controlled by a sample pulse b of the delay circuit 24 and the switch circuit 35 is controlled by a pulse e of the second divider 22.

When the switch circuit 32, 35 are "on", the buffer amplifiers 31, 34 charge the hold condensers 33, 36 respectively through the switch circuits 32, 33, and therefore respective output signal of the buffer amplifiers 31, 34 is sampled.

When the switch circuits 32, 35 are "off", the hold condensers 33, 36 are not discharged and the buffer amplifiers 34, 37 each has a high input impedance, and therefore a sampling voltage is held.

Accordingly an input signal is sampled and held through the first buffer amplifier 31 and the first switch circuit 32 at the first hold condenser 33, the hold voltage of the first hold condenser 33 is sampled and held through the second buffer amplifier 34 and the second switch circuit 35 at the second hold condenser 36. The hold voltage of the second hold condenser 36 is transmitted through the third buffer amplifier 37.

With reference to FIG. 2, an operation of an embodiment is described more specifically as follows.

A luminance signal of a reproduced color image signal including a jitter, which is reproduced by a helical scan VTR, is supplied through the end 10 to the horizontal synchronizing signal separator 11, at which the horizontal synchronizing signal is separated and transmitted. The separated horizontal synchronizing signal is illustrated as a solid line "a" in FIG. 6A and is phased out of an original horizontal synchronizing signal without a jitter as shown as a dashed line (i.e. a jitter included). The horizontal synchronizing signal a is delayed and shaped at the delay circuit 24. The wave-shaped signal is converted into a sample pulse b with a given width as shown in FIG. 6B and applied to the first SH circuit 25.

The frequency divider 21 divides the output oscillation frequency of 640 $f_H$ by 64 and the frequency divider 22 divides an output of the frequency divider 21 by 10, thus producing a pulse of about 1H cycle.

Figure 6A:
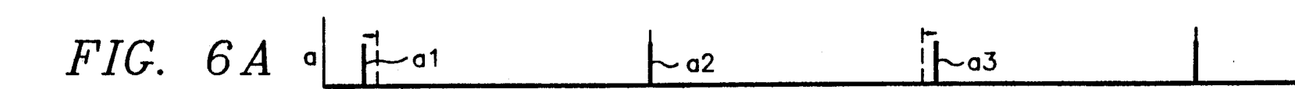
FIGS. 6A-6H are time charts for describing an operation of a circuit shown in FIG. 2.
Figure 6B:
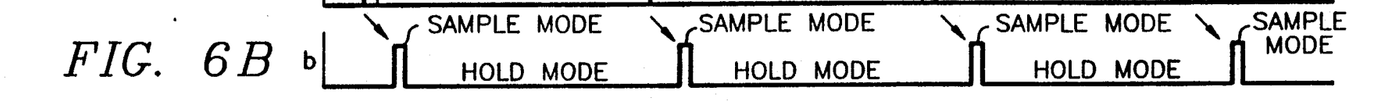
Figure 6C:
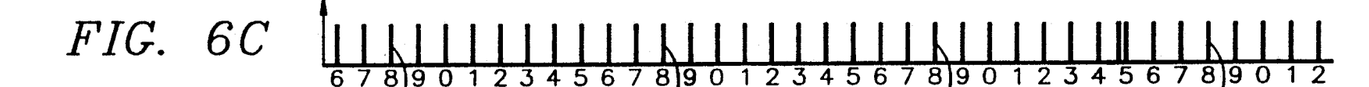

The frequency divider 22 comprising a Johnson counter counts by a timing as illustrated typically in FIG. 6C. The counter sequentially generates pulses of 1H cycle as illustrated in FIG. 3C to 3L through the 10 output terminals within 1H period.

Figure 6D:
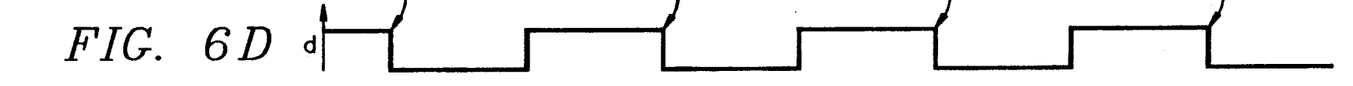
Figure 6E:
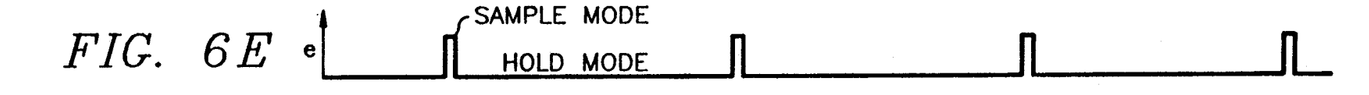
Figure 6F:
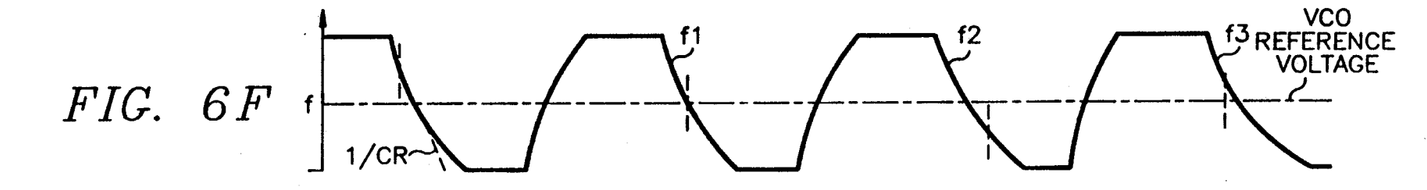

When the frequency divider 22 (Johnson counter) has a count value of "8", the monostable multivibrator 23 is triggered by a pulse of FIG. 3K generated from the frequency divider 22. The monostable multivibrator 23 generates a pulse d of low level as shown in FIG. 6D from a trigger point to a given period less than 1H period. The output pulse d is integrated by the integrating circuit consisting of the resistor R1 and the variable capacitance diodes D1, D2. And the pulse d is converted to an integrating waveform f (oblique wave) as shown in FIG. 6F. A timing of a beginning part of a trailing edge of the oblique wave is determined by the trigger point of the monostable multivibrator 23, i.e. a point of the count value "8".

A tilt of the oblique wave f is varied by the sample hold voltage because the output sample hold voltage of the second SH circuit 26 is applied to the variable capacitance diodes D1, D2 as an anti bias voltage to vary a capacitance of the variable capacitance diodes D1, D2.

Figures 6G, 6H:
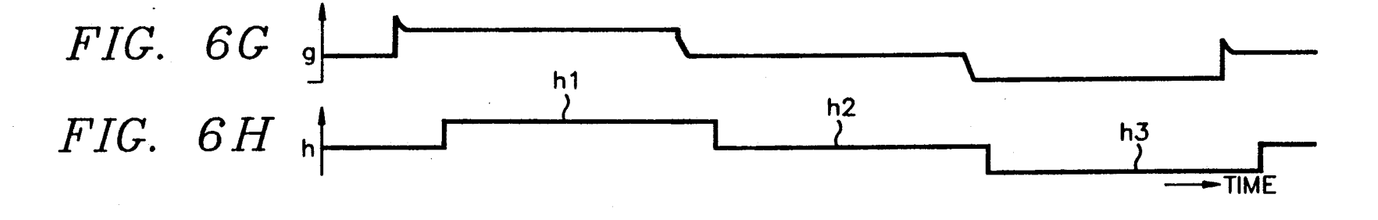

The oblique wave f is transmitted to the first SH circuit 25, at which the oblique wave is sampled in a period of high level of a sample pulse b and is held in a period of low level of the sample pulse b. Accordingly the first SH circuit 25 generates a sample hold voltage g as shown in FIG. 6G. The sample hold voltage g is transmitted to the second SH circuit 26, and is sampled in period of high level of a pulse e of about 1H cycle of FIG. 6E (The same pulse as shown in FIG. 3C), the high level of the pulse e being generated from the frequency divider 22 at a counter value of "0", and thereafter held in a period of low level of the pulse e.

The period of high level of the sample pulse e is set as a timing within a horizontal blanking period of the reproduced color image signal including the jitter and as a stable hold period of the sample hold voltage g. Accordingly the second SH circuit 26 generates a sample hold voltage h without an overshoot on a leading edge as shown in FIG. 6H. The sample hold voltage h generated according to a detection jitter before 1H period is applied to the VCO 12 as a control voltage and to the variable capacitance diodes D1,D2 as an anti bias voltage.

When the reproduced horizontal synchronizing signal a1 as shown in FIG. 6A has a jitter being controlled more quickly than the original horizontal synchronizing signal, an upper portion higher than a central electric potential portion of the tilt edge of the oblique wave f is sampled so that the output sample hold voltage h of the second SH circuit 26 becomes as high as h1 illustrated in FIG. 6H. The output oscillation frequency of the VCO 12 becomes higher than 640 $f_H$. The anti bias voltage applied to the variable capacitance diodes D1, D2 becomes higher so as to lessen a capacity of the variable capacitance diodes D1, D2. When the capacity of the variable capacitance diodes D1, D2 is lessened, the tilt edge of the oblique wave f generated from the integrating circuit is as steep as the oblique wave f1 as shown in FIG. 6F.

When the reproduced horizontal synchronizing signal a2 as shown in FIG. 6A is generated in the same phase as the original horizontal synchronizing signal, a central electric potential portion of the tilt of the oblique wave f is sampled by the first SH circuit 25 so that the sample hold voltage h becomes a reference voltage h2 as shown in FIG. 6H. Accordingly the VCO 12 generates an oscillation frequency of 640 $f_H$ and the tilt of the oblique wave f has a given value f2 as shown in FIG. 6F.

When the reproduced horizontal synchronizing signal a3 as shown in FIG. 6A has a jitter, generated and delayed from the original horizontal synchronizing signal, the part lower than the central portion of the tilt edge of the oblique wave f is sampled so that the sample hold voltage h of the second SH circuit 26 becomes as low as h3 shown in FIG. 6H. The output oscillation frequency of the VCO 12 is lower than 640 $f_H$, and the capacity of the variable capacitance diodes D1, D2 becomes larger. Accordingly the tilt of the oblique wave f has a gentle gradient f3 as shown in FIG. 6F.

Figure 7A:
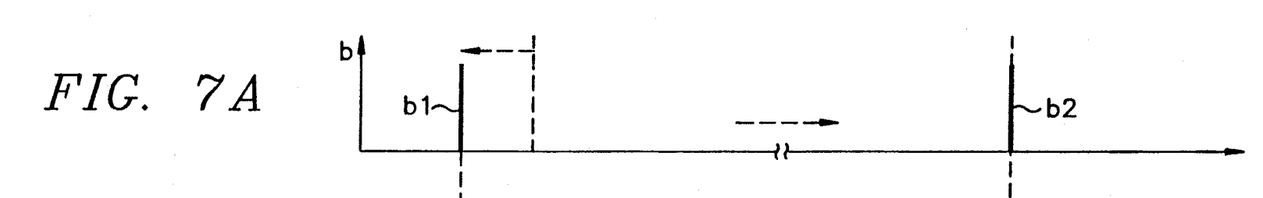
FIGS. 7A-7C are time charts for describing an operation of an important part shown in FIG. 2.
Figure 7B:
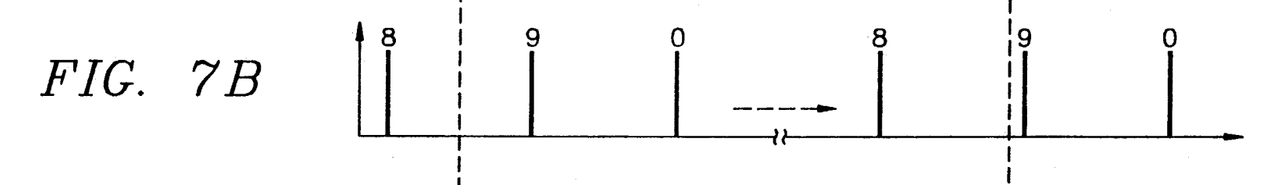

With reference to FIG. 7, a variable operation of the tilt of the oblique wave f is described as follows. FIG. 7A shows a sample pulse b and FIG. 7B shows a variation of counting value of the second frequency divider 22.

Figure 7C:
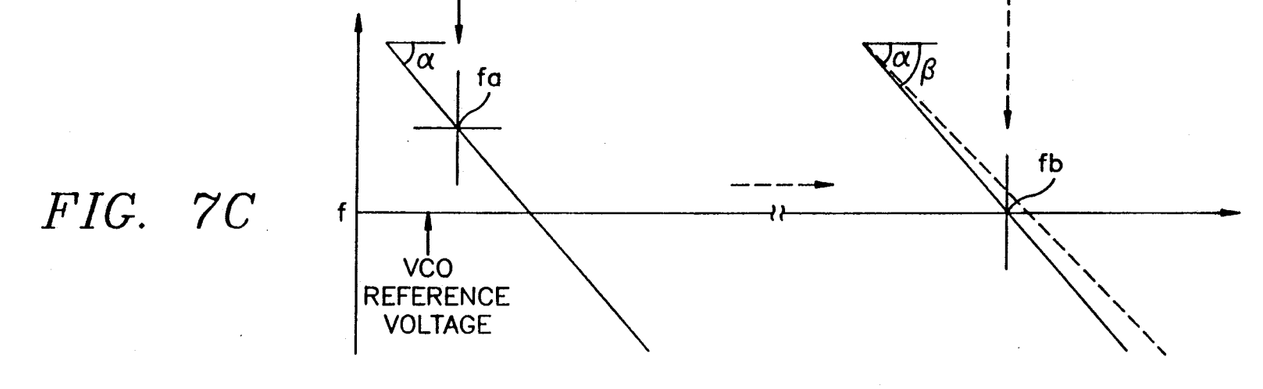

Supposed that a tilt angle of the oblique wave f is 'a', as illustrated in FIG. 7C when a jitter has a value of "0", a tilt portion $f_a$ higher than a reference voltage of the VCO 12 is sampled and held by the SH circuit 25 if a jitter is produced so as to generate a sample pulse b1 earlier than an original phase (shown as a dashed line). Accordingly the output oscillation frequency of the VCO 12 becomes high.

When the sample pulse b2 is produced in an original phase (Value of a jitter is "0") as shown in FIG. 7A, the reference voltage (Central electric potential portion of the tilt of the oblique wave f) of the VCO 12 is sampled at the SH circuit 25. However the voltage higher than the central electric potential portion of the oblique wave f is sampled at the tilt angle of "α". But the reference voltage $f_b$ of central electric potentiality of the VCO 12 can be sampled by changing the tilt angle "α" of the oblique wave f into a steeper "β" as shown in FIG. 7C. Because the SH circuit 26 performs a sampling of an output pulse of the frequency divider 22, the frequency divider 22 is synchronized with an input signal.

Consequently a jitter of high frequency is also detected, which is not detected in a conventional method, because a sample hold voltage "h" varying according to a jitter before 1H period is generated.

Figure 8:
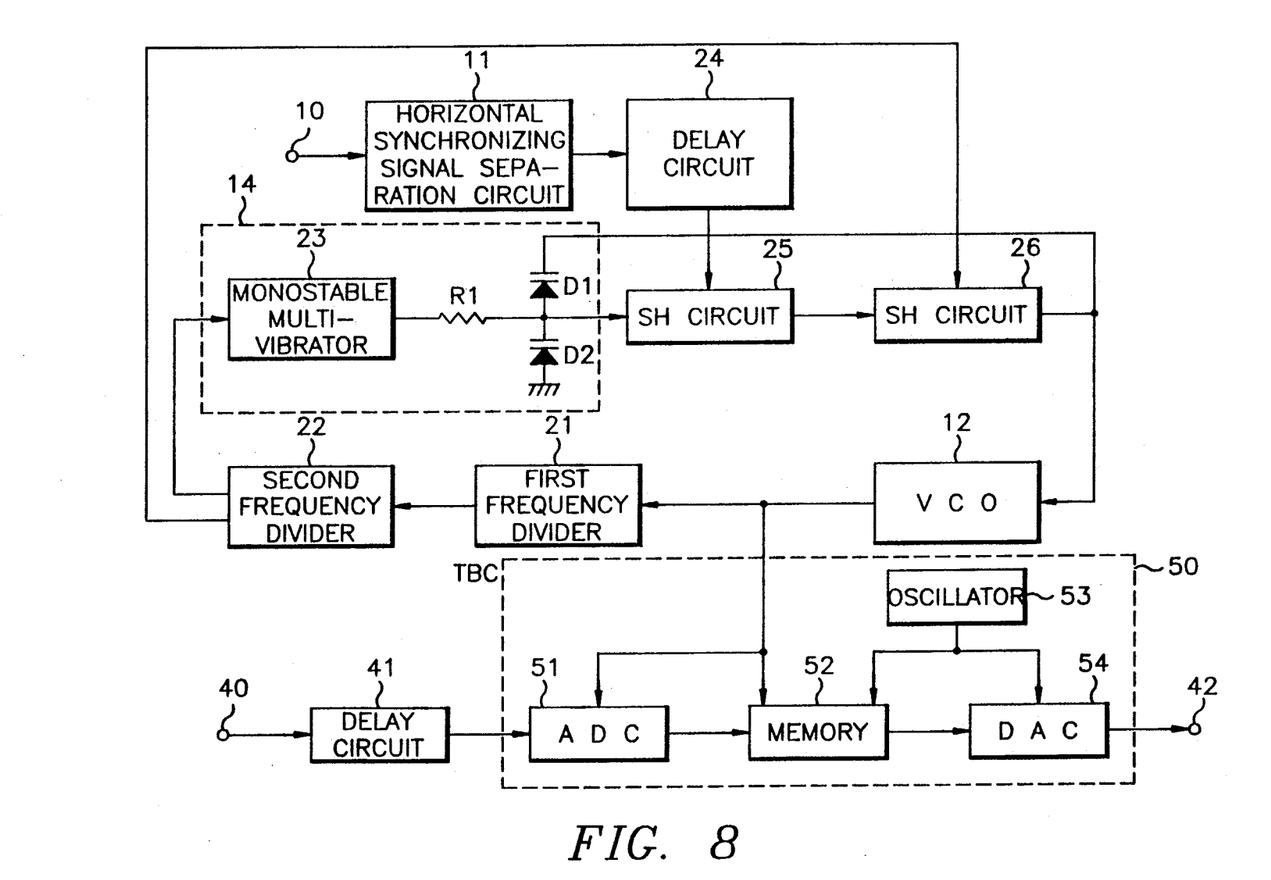
FIG. 8 is a block diagram of a circuit applying an exemplary embodiment of this invention as a writing clock generating circuit of a TBC.

With reference to FIG. 8, there is described that the jitter detection circuit of this invention is applied to a writing clock of the TBC.

A delay circuit 41 receives a reproduced color image signal generated from a VTR of low band conversion color recording and reproducing method through its input terminal 40. And the delay circuit 41 delays the reproduced color image signal somewhat longer than a delay time of the delay circuit 24 so as to allow a period of an input sample pulse "h", shown in FIG. 6H of the SH circuit 26, be within a horizontal blanking period of the reproduced color image signal. Thereafter the reproduced color image signal is transmitted to the time base corrector 50. The reproduced color image signal received at the terminal 40 is also received directly at the input terminal 10, or the reproduced luminance signal separated from the reproduced color image signal is received at the input terminal 10. Accordingly an output reproduced color image signal of the delay circuit 41 has the same jitter as an output reproduced horizontal synchronizing signal of the horizontal synchronizing signal separator 11.

The TBC 50 comprises an analog/digital converter 51 (hereinafter called as "ADC"), a memory 52 for reading and writing, an oscillator 53 for generating a reading clock and a digital/analog converter 54(hereinafter called as "DAC") as a conventional configuration of a circuit. A jitter detection signal of frequency of 640 $f_H$ from the VCO 12 is applied to the ADC 51 and the memory 52 as a reference clock and a writing clock respectively.

The ADC 51 converts an output reproduced color image signal of the delay circuit 41 into a jitter signal by the reference clock, and transmits it to the memory 52. The jitter is sequentially recorded on the memory 52 by the writing clock from the VCO 12. Because the writing clock of the memory 52 has the same jitter as that of the reproduced color image signal even if the reproduced color image signal has a jitter, a digital signal of the reproduced color image signal is recorded sequentially in a given address of the memory 52.

Because a variation point of frequency of the writing clock owing to a jitter is within a horizontal blanking period of the reproduced color image signal recorded on the memory 52, a picture information is not influenced at all and the writing clock is not varied during an existence of the picture information of the reproduced color image signal. And because frequency of an output jitter detection signal of the VCO 12 varies according to a jitter before 1H period, the jitter is followed up excellently as compared with a conventional method and accordingly a tape/head impact error jitter or a skew of step response are also followed up sufficiently.

Because the digital signal stored in the memory 52 is read by a reading clock of high stable frequency of 640 $f_H$ via the oscillator 53, the jitter is eliminated completely when it is read. The digital image read from the memory 52 is converted into the analog signal by the DAC 54, and transmitted to an output end 42 as the reproduced color image signal having a complete frequency interleaving relation between the reproduced luminance signal and the reproduced carrier chrominance signal.

This invention is not limited to the embodiment described as above. For example, the variable capacitance diode D2 constituting an integrating circuit can be replaced with a resistor; and the monostable multivibrator 23 also can be replaced with a pulse generator for producing a pulse having a given width. The variable oblique wave generator 14 can be in any configuration capable of varying a tilt angle by an output sample hold voltage of the SH circuit 26. Accordingly the output waveform is not limited to an integrating waveform, it can be a triangular or a standing waveform. Further, this invention is not limited to a reproduced image signal of a VTR, but it can be applied to a reproduced image signal of a magnetic tape or an optical disc.

In conclusion, a jitter of comparatively higher frequency is also detected efficiently because a sample hold voltage is produced according to a jitter before 1H period and an output oscillation frequency of the voltage control oscillator is varied by the sample hold voltage.

And a jitter is detected correctly because a pulse is produced by dividing a time interval between any horizontal synchronizing signal and a next horizontal synchronizing signal by "m".

The most optimum jitter is detected because an oblique wave having a tilt due to a jitter is produced at a timing according to a jitter before 1H period.

A sample hold voltage without a confused waveform is produced, a stable jitter detection is performed without deviating from a synchronization and a jitter of a reproduced image signal is eliminated without influencing a picture information, because a sample hold circuit is connected in a two stepped cascade.

Because an image signal including a jitter is recorded in a time base corrector by following up a jitter of high frequency, jitters of a wide range are eliminated by the time base corrector as compared with a conventional method.

It is further understood by those skilled in the art that the foregoing description is a preferred embodiment of the disclosed device and that various changes and modification may be made in the invention without departing from the spirit and scope thereof.

What is claimed is:

1. A circuit for detecting a jitter, comprising:
   synchronizing separation means for separating a horizontal synchronizing signal from an image signal;
   voltage control oscillator means for generating a frequency of "n" times of said horizontal synchronizing signal, said "n" being an integral number more than 4;
   frequency dividing means for dividing the output frequency of said voltage control oscillator means by said "n";
   variable oblique wave generating means for generating an oblique wave in dependence upon a phase of the output pulse of said frequency dividing means, wherein a tilt portion of said oblique wave being varied by a control signal; and
   sample-hold means for sampling and holding said tilt portion of said oblique wave as a sample pulse of about one horizontal scanning period in dependence upon said horizontal synchronizing signal, and for supplying a sample hold voltage to said voltage control oscillator means as a control voltage and to said variable oblique wave generating means as said control signal, whereby a jitter detection signal is produced from said voltage control oscillator means.

2. The circuit for detecting a jitter as claimed in claim 1, wherein said frequency dividing means comprises:

first frequency divider means for dividing said output frequency of said voltage control oscillator means by "k", wherein said "k" is an integer greater than 2 and less than said "n"; and second frequency divider means having a number of "m" output terminals each respectively generating sequentially a pulse in dependence upon an output frequency of said first frequency divider means, wherein "m" is an integer expressed as n/k, a first output pulse from a first terminal of said "m" output terminals is transmitted to said variable oblique wave generating means and a second output pulse from a second terminal of said "m" output terminals is transmitted to said sample-hold means.

3. The circuit for detecting a jitter as claimed in claim 2, wherein said second frequency divider means is a Johnson counter.

4. The circuit for detecting a jitter as claimed in claim 1, wherein said variable oblique wave generating means comprises;
pulse generating means for generating a pulse having a given width less than one horizontal scanning period in dependence upon an output pulse of said frequency dividing means at a point before a sampling point of said sample pulse; and
integrating means for integrating the output pulse of said pulse generating means to generate said oblique wave having an integration visibility value in dependence upon said control signal.

5. The circuit for detecting a jitter as claimed in claim 4, wherein said pulse generating means is a monostable multivibrator, and said integrating means comprises:
a resistor having one end connected to said monostable multivibrator;
a first variable capacitance diode having an anode connected to said resistor, and a cathode for receiving said control signal as an anti-bias voltage; and
a second variable capacitance diode having a cathode connected to said resistor and an anode connected to a reference potential.

6. The circuit for detecting a jitter as claimed in claim 1, wherein said sample-hold means comprises:
delay means for generating said sample pulse in dependence upon said horizontal synchronizing signal;
first means for sampling and holding the tilt portion of said oblique wave in accordance with said sample pulse; and
second means for sampling and holding the output signal of said first means during a horizontal blanking period of said image signal to generate said sample hold voltage.

7. The circuit for detecting a jitter as claimed in claim 1, wherein the output frequency of said voltage control oscillator means is supplied to a time base corrector for eliminating said jitter from said image signal.

8. A jitter detecting apparatus, comprising:
means for receiving a video signal;
means for separating a synchronizing signal from siad video signal;
means for generating an oscillation frequency signal in dependence upon said synchronizing signal;
means for dividing said oscillation frequency signal to provide a first sample signal and a trigger signal;
means for generating an oblique wave signal in dependence upon said trigger signal, said oblique wave signal having a tilt portion in dependence upon a control voltage signal; and
means for sampling and holding said tilt portion of said oblique wave signal in dependence upon said synchronizing signal and said first sample signal to provide a sample-hold voltage signal to control a generation of said oscillation frequency signal.

9. The jitter detecting apparatus as claimed in claim 8, further comprised a time base corrector coupled to receive said oscillation frequency signal, for eliminating a jitter of said video signal.

10. The jitter detecting apparatus as claimed in claim 8, wherein said sampling and holding means comprises:
delay means coupled to receive said synchronizing signal, for delaying said synchronizing signal for a delay period to provide a second sample signal having a given width;
first sample-hold means for sampling and holding said tilt portion of said oblique wave signal in accordance with said second sample signal to provide an intermediate signal; and
second sample-hold means for sampling and holding said intermediate signal during a horizontal blanking period of said video signal in accordance with said first sample signal to provide said sample-hold voltage signal.

11. The jitter detecting apparatus as claimed in claim 10, wherein said delay means is a cascade of two connecting monostable multi-vibrators, and said first and second sample-hold means comprise:
a first buffer amplifier having a low output impedance and a high input impedance, for amplifying the tilt portion of said oblique wave signal to provide a first amplified signal;
a first field-effect transistor for enabling transmission of said first amplified signal in accordance with said second sample signal to provide a first transmitted signal;
a first capacitor for holding a sampling voltage of said first transmitted signal;
a second buffer amplifier having a low output impedance and a high input impedance, for amplifying said first transmitted signal to provide said intermediate signal;
a second field-effect transistor for enabling transmission of said intermediate signal in accordance with said first sampled signal to provide a second transmitted signal;
a second capacitor for holding a sampling voltage of said second transmitted signal; and
a third buffer amplifier having a low output impedance and a high input impedance, for amplifying said second transmitted signal to provide said sample-hold voltage signal.

12. The jitter detecting apparatus as claimed in claim 8, wherein said dividing means comprises:
first frequency divider means for dividing said oscillation frequency signal by a first factor to provide an intermediate signal; and
second frequency divider means for dividing said intermediate signal by a second factor, and for sequentially generating said trigger signal during each horizontal cycle and said first sample signal.

13. The jitter detecting apparatus as claimed in claim 12, wherein said second frequency divider means is a Johnson counter consisting of a 5-steps shift register and a decoder.

14. The jitter detecting apparatus as claimed in claim 8, wherein said oblique wave signal generating means comprises:

pulse generator means having an input terminal coupled to receive said trigger signal, and an output terminal for generating a single output pulse having a pulse width less than one horizontal scanning period in dependence upon reception of said trigger signal; and integrator means having a selected integration visibility value, for integrating said single output pulse in dependence upon reception of said control voltage signal to provide said oblique wave signal.

15. The jitter detecting apparatus as claimed in claim 14, wherein said pulse generator means is a monostable multi-vibrator, and said integrator means comprises:
a first variable capacitance diode having an anode connected to said output terminal of said monostable multi-vibrator via a resistor, and a cathode coupled to receive said control voltage signal as an anti-bias voltage; and
a second variable capacitance diode having a cathode connected to said output terminal of said monostable multi-vibrator via said resistor, and an anode connected to a reference potential, whereby said selected integration visibility value is dependent upon a resistance value of said resistor and capacitance values of said first and second variable capacitance diodes.

16. The jitter detecting apparatus as claimed in claim 8, wherein said oscillation frequency signal generating means is a voltage controlled oscillator having a self-oscillation frequency of 640 $f_H$, where $F_H$ is a horizontal scanning frequency.

17. A jitter detecting apparatus, comprising:
means for receiving a video signal;
means for separating a synchronizing signal from said video signal;
delay means for delaying said synchronizing signal for a delay period to provide a first sample signal;
pulse generator means for generating a single pulse signal having a pulse width less than one horizontal scanning period in dependence upon reception of a trigger signal;
integrator means having a selected integration visibility value, for integrating said single pulse signal to provide an oblique wave signal having a tilt portion in dependence upon reception of a control voltage signal;
sample-and-hold means for sampling and holding the tilt portion of said oblique wave signal in accordance with said first sample signal and a second sample signal to provide said control voltage signal;
means for generating an oscillation frequency signal having a jitter detection signal in dependence upon said control voltage signal;
means for dividing said oscillation frequency signal to provide said second sample signal and said trigger signal; and means for time-base correcting said oscillation frequency signal.

18. The jitter detecting apparatus as claimed in claim 17, wherein said pulse generator means is a monostable multi-vibrator, and said integrator means comprises:
a first variable capacitance diode having an anode connected to said output terminal of said monostable multi-vibrator via a resistor, and a cathode coupled to receive said control voltage signal as an anti-bias voltage; and
a second variable capacitance diode having a cathode connected to said output terminal of said monostable multi-vibrator via said resistor and an anode connected to a reference potential, whereby said selected integration visibility value is dependent upon a resistance value of said resistor and capacitance values of said first and second variable capacitance diodes.

19. The jitter detecting apparatus as claimed in claim 17, wherein said delay means is a cascade of two connecting monostable multi-vibrators, and said sample-and-hold means comprises:
a first buffer amplifier having a low output impedance and a high input impedance, for amplifying the tilt portion of said oblique wave signal to provide a first amplified signal;
a first field-effect transistor for enabling transmission of said first amplified signal in accordance with said first sample signal to provide a first transmitted signal;
a first capacitor for holding a sampling voltage of said first transmitted signal;
a second buffer amplifier having a low output impedance and a high input impedance, for amplifying said first transmitted signal to provide an intermediate signal;
a second field-effect transistor for enabling transmission of said intermediate signal in accordance with said second sampled signal to provide a second transmitted signal;
a second capacitor for holding a sampling voltage of said second transmitted signal; and
a third buffer amplifier having a low output impedance and a high input impedance, for amplifying said second transmitted signal to provide said sample-hold voltage signal.

20. The jitter detecting apparatus as claimed in claim 17, wherein said dividing means comprises:
first frequency divider means for dividing said oscillation frequency signal by a first factor to provide an intermediate signal; and
second frequency divider means for dividing said intermediate signal by a second factor, and for sequentially generating said trigger signal during each horizontal cycle and said second sample signal.

* * * * *

UNITED STATES PATENT AND TRADEMARK OFFICE
CERTIFICATE OF CORRECTION

PATENT NO. : 5,298,999
DATED : March 29, 1994
INVENTOR(S) : Yasuyuki Nagano

It is certified that error appears in the above-indentified patent and that said Letters Patent is hereby corrected as shown below:

Line 7,         After "signal", Insert --;-- .

Column 1,   Line 27,      Delete "helical" (first occurrence), After "of", Insert --a-- ;

Line 52,      After "terminal", Insert --1-- ;

UNITED STATES PATENT AND TRADEMARK OFFICE
CERTIFICATE OF CORRECTION

PATENT NO.   : 5,298,999
DATED        : March 30, 1992
INVENTOR(S)  : Yasuyuki Nagano It is certified that error appears in the above-indentified patent and that said Letters Patent is hereby corrected as shown below:

| Column 5, | Line 1,  | Delete "which is" ; |
|---|---|---|
|           | Line 57, | After "cathode", Delete "is" ; |
|           | Line 58, | Preceding "anode", Change "on" to --an-- ; |
| Column 6, | Line 25, | Preceding "an output", Insert --in dependance upon-- ; |
|           | Line 26, | Delete "independence upon" ; |
| Column 8, | Line 45, | Change 'a' to '$\alpha$'. |

UNITED STATES PATENT AND TRADEMARK OFFICE
CERTIFICATE OF CORRECTION

PATENT NO. : 5,298,999
DATED : March 30, 1992
INVENTOR(S) : Yasuyuki Nagano

It is certified that error appears in the above-indentified patent and that said Letters Patent is hereby corrected as shown below:

Column 11, Line 59, Change "siad" to --said-- ;

Column 13, Line 30, Change "$F_H$" to --$f_H$-- ;

Signed and Sealed this

Fourth Day of October, 1994

Attest:

BRUCE LEHMAN

Attesting Officer

Commissioner of Patents and Trademarks